S. N. HAVILAND & J. G. MORRISON.
WATER CLOSET VALVE.
No. 175,558. Patented April 4, 1876.
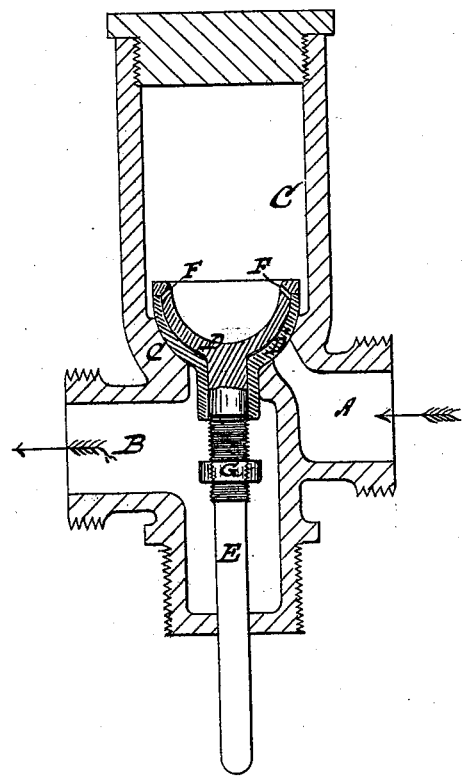
Witnesses.
Inventors.

UNITED STATES PATENT OFFICE.

STEPHEN N. HAVILAND AND JOHN G. MORRISON, OF WINFIELD, NEW YORK.

IMPROVEMENT IN WATER-CLOSET VALVES.

Specification forming part of Letters Patent No. 175,558, dated April 4, 1876; application filed March 1, 1876.

*To all whom it may concern:*

Be it known that we, STEPHEN N. HAVILAND and JOHN G. MORRISON, of Winfield, in the county of Queens and State of New York, have invented an Improvement in Water-Closet Valves, whereof the following is a specification:

In our said invention we have a double-acting valve arranged upon a suitable valve-stem and working in a water-chamber, the valves being, preferably, of a cup form, fitted to a cup-formed valve-seat, through which the water is admitted. We have also combined with the valves a means of adjustment of their relation to each other, according to the amount or degree of pressure of the water.

Referring to the annexed drawing, which is a vertical longitudinal section of the water-chamber, A is the pipe for the ingress of the water, and B is the discharge-pipe. C is the water-chamber containing the valve or valves D D'. The valve D is affixed to the valve-stem E, and is ground to the valve D'. One side of D' serves as the seat for the valve D, and the other side of D' is ground to its seat in the chamber C. The valve D has several small apertures, F, through which water may pass when allowed to do so by the valve D', which is arranged to slide on the valve-stem and move a greater or less distance from the valve D, such motion being adjustable in extent by means of a suitable adjusting device, represented in the drawing by a nut, G, on the valve-stem, which is threaded therefor.

The valve or valves are operated by a lever or other device acting against the protruding end of the valve-stem, in any usual manner. When pressure is so applied to the valve-stem, the valve D moves first a portion of the water in the chamber beyond the valve, passing through the apertures F therein, the valve D' moving on the valve-stem until it comes in contact with the nut G, and the water rushes through, entering A and discharging at B, while the valves are held open.

When pressure is removed from the valve-stem, the valves gradually settle down as the water in the chamber slowly comes through the apertures F in valve D, and finds its way out, passing around and under the valve D' until both valves rest on their seats. The apertures, by thus admitting a portion of the water, prevent the immediate closing of the valves, and allow the required flow of water for the basin after the means of working the valve have ceased to operate upon it. The valve D is, therefore, double-acting.

From the foregoing description it will be seen that no india-rubber, leather, or other packing is used, the valves being simply ground to their seats. The absence of such packing is a very great advantage, as its use in water-closet valves is the chief cause of their derangement. The conical or cup form also enhances the certainty of the valves wearing to their seats, and thus preserving themselves in working order.

We claim as our invention—

1. The combination of fixed and movable cup or conical valves on the same stem, with a concave valve-seat, as set forth.

2. The combination, with a fixed valve and movable valve, one of which is provided with apertures, as described, of the adjustable nut G on the valve-stem, or any equivalent therefor, for the purpose specified.

S. N. HAVILAND.
J. G. MORRISON.

Witnesses:
HENRY E. ROEDER,
J. B. NONES.